(12) United States Patent
Bausov et al.

(10) Patent No.: US 8,063,814 B1
(45) Date of Patent: Nov. 22, 2011

(54) BEAT-PRODUCT RADIO IMAGING METHOD (RIM)

(75) Inventors: Igor Bausov, Raton, NM (US); Gerald Stolarczyk, Raton, NM (US); Larry G. Stolarczyk, Raton, NM (US)

(73) Assignee: Stolar Research, Inc., Raton, NM (US)

( * ) Notice: Subject to any disclaimer, the term of this patent is extended or adjusted under 35 U.S.C. 154(b) by 0 days.

(21) Appl. No.: 12/815,420

(22) Filed: Jun. 15, 2010

(51) Int. Cl.
*G01S 13/89* (2006.01)
*G01S 13/88* (2006.01)

(52) U.S. Cl. ............. 342/22; 342/21; 342/179; 342/180

(58) Field of Classification Search .................... 342/22, 342/21, 175, 179–180, 194–196
See application file for complete search history.

(56) References Cited

U.S. PATENT DOCUMENTS

| | | | | |
|---|---|---|---|---|
| 4,308,505 A | * | 12/1981 | Messerschmitt | ................. 331/25 |
| 4,620,192 A | * | 10/1986 | Collins | ......................... 342/128 |
| 5,325,095 A | * | 6/1994 | Vadnais et al. | ................... 342/22 |
| 6,072,427 A | * | 6/2000 | McEwan | ........................ 342/175 |
| 6,191,724 B1 | * | 2/2001 | McEwan | ........................ 342/21 |
| 6,462,705 B1 | * | 10/2002 | McEwan | ........................ 342/175 |
| 2003/0062902 A1 | * | 4/2003 | Stolarczyk | .................... 324/334 |
| 2003/0132751 A1 | * | 7/2003 | Stolarczyk | .................... 324/334 |
| 2009/0262006 A1 | * | 10/2009 | McNeill et al. | ................. 342/22 |
| 2010/0292568 A1 | * | 11/2010 | Droitcour et al. | ............. 600/425 |

* cited by examiner

*Primary Examiner* — John Sotomayor
(74) *Attorney, Agent, or Firm* — Richard B. Main

(57) ABSTRACT

A beat-product radio imaging method (RIM) system uses a matched continuous wave (CW) transmitter and receiver to electronically image material in between. Signal attenuation measurements are taken from a number of different transmitter and receiver perspectives around the material. The transmitter and receiver each have a crystal oscillator rated at 10-ppm or better frequency uncertainty. The receiver's crystal oscillator is used as a local oscillator to beat down the transmitter's carrier frequency to baseband. The frequency error between the local oscillator and the transmitter carrier frequencies produces a beat product of less than one Hertz in frequency and its magnitude is inversely proportional to the path attenuation between the transmitter and receiver. An extremely low-pass filter is used to remove everything above one Hertz in the detector. The receiver sensitivity is therefore extraordinarily high.

14 Claims, 2 Drawing Sheets

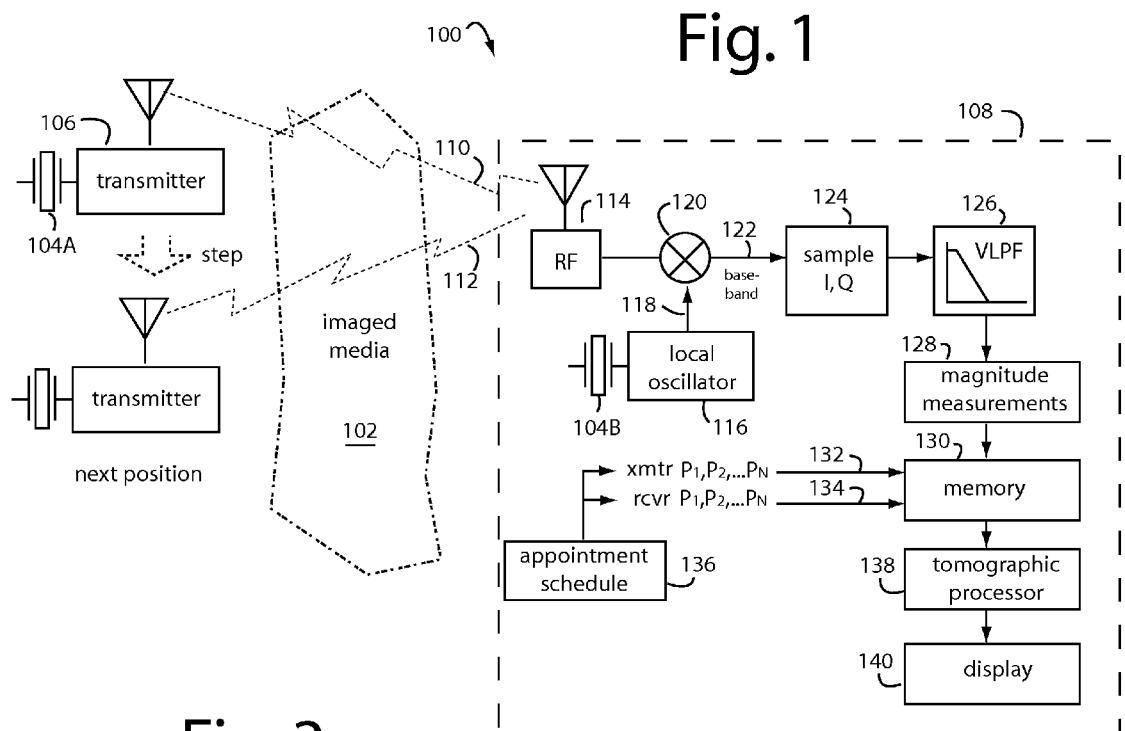
Fig. 1
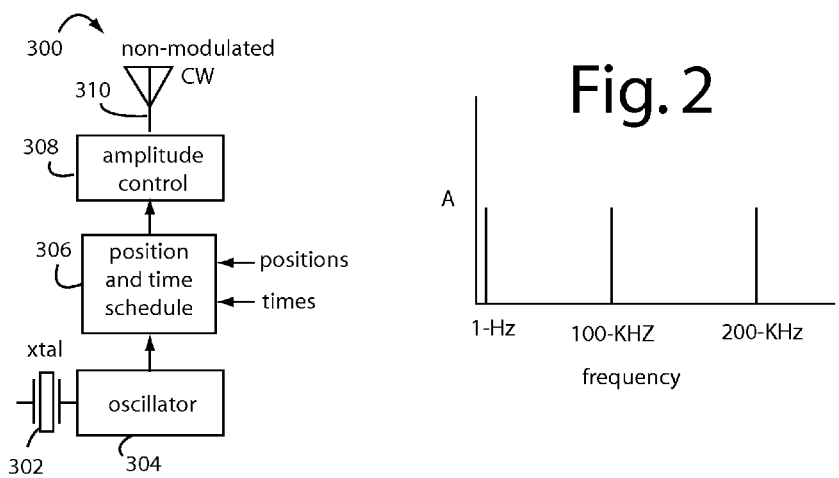
Fig. 3
Fig. 2

BEAT-PRODUCT RADIO IMAGING METHOD (RIM)

FIELD OF THE INVENTION

The present invention relates to ground-penetrating radars and coal mining, and more particularly to methods and systems for radio-imaging anomalous geology in coal bed deposits.

DESCRIPTION OF THE PRIOR ART

Given the growing need to produce cleaner run-of-mine (ROM) coal, improved information about the seam geology and coal quality in coal mine operations is of great value. The identification of anomalies is important so planning operations keep productivity high and cut cleaner coal. For example, the identification of a paleochannel anomaly before mining began would allow longwall panels to be laid out to avoid crossing it.

Stolar, Inc. (Raton, N. Mex.) has developed several generations of highly sophisticated radar imaging method (RIM) equipment that can produce tomographic images of coal seams. A natural coal seam waveguide occurs in layered sedimentary geology because the electrical conductivity of the bounding shale, mudstone, and fire clay, ranges between 0.01 and 0.1 Siemens per meter (S/m) (100 and 10 ohm-meters). Inside, the conductivity of the coal is near 0.0005 S/m (2,000 ohm-meters). The 10:1 conductivity contrast enables the waveguide travel of electromagnetic waves within the coal bed.

The electric field ($E_z$) component of a traveling electromagnetic wave (EM) is polarized in a vertical direction and the magnetic field ($H_y$) component is polarized horizontally in the seam. The energy in this part of the EM wave travels in the coal seam from the transmitter to the radio imaging receiver. There is a horizontally polarized electric field ($E_x$) that has zero value in the center of the seam and reaches maximum value at the sedimentary rock-coal interface. This component is responsible for transmission of the electromagnetic wave signal into the boundary rock layer. The energy in this part of the EM wave travels vertically in the coal deposit.

The magnitude of coal seam radiowave decreases as it travels along the waveguide. The attenuation rate and cylindrical spreading of wave energy in the coal seam are two of the things at work that attenuate the traveling signals. The cylindrical spreading factor is $$\frac{1}{\sqrt{r}},$$

where r is the distance from the transmitting to receiving antenna. This factor compares with the non-waveguide far-field spherically spreading factor of $$\frac{1}{r}.$$

Thus, for a given separation of one-hundred meters, the magnitude of the seam EM wave decreases by ten in a waveguide, and by a factor of one-hundred in an unbounded media. So one advantage of sending signals down a seam waveguide is the much greater travel distance. Another advantage is that the traveling electromagnetic wave predominantly stays within the coal seam, the main item of interest.

A coal-seam electromagnetic wave is very sensitive to changes in the waveguide geometry and materials. The radio-wave attenuation rate (decibels per 100 feet) and phase shift (electrical degrees per 100 feet) were determined by Dr. David Hill at the National Institute for Science and Technology (NIST). Dr. James Wait recognize that natural waveguides exist in the earth's crust. The science underlying the traveling of an electromagnetic wave in the coal seam waveguide is well known. The engineering of both the cross-hole transmitter and receiver has also been developed to a high degree of performance. The transmitter and receiver are synchronized to enable the measurement of total path phase shift from the transmitter to the receiver location.

In uniform-construction waveguides, the path is a straight line. The path length or distance a radio signal travels can be determined from signal measurements. The straight line path is an assumption used in the Algebraic Reconstruction Technique (ART) tomography algorithm. But radiowaves are refracted near significant geologic anomalies causing the travel path of the radiowave to bend and be longer than in the uniform waveguide case. This bending cannot be accounted for in ART processing and accounts for this distortion in the ART tomography processing algorithm. The bending effect can be accounted for in tomography reconstruction used to build three-dimensional images of anomalous geology. The effect of attenuation in the waveguide is to reduce the magnitude of the electromagnetic wave along the path.

Under sandstone sedimentary rock, the attenuation rate increases because more of the radio imaging signal travels vertically into the boundary rock, e.g., leaks from the waveguide. If water is injected into the coal, then clay in the coal causes the electrical conductivity to decrease and the attenuation rate/phase shift to increase.

The attenuation rate/phase shift rapidly increases with decreasing seam height. Thus coal seam thinning can be easily detected with radio imaging. The above graphical presentation of coal seam waveguide attenuation and phase constants represents the science factor in the art and science of interpreting radio imaging tomographic images. Higher attenuation rate zones suggest that either the coal seam boundary rock is changing, the seam is rapidly thinning, or/and water has been injected into the coal seam. Drilling and radar would determine the exact cause of the anomalous seam condition. This advance in the state of the art in mining would reduce both risk and cost in coal extraction.

Faults and dykes cause reflections to occur in the waveguide. The reflections can appear as excess path loss. Total phase shift measurements are useful in detecting reflection anomalies.

The predominating electromagnetic wave propagation mode in layers of coal is a "seam wave". Such is polarized in the vertical plane of the seam, and has a uniform, polarized electric field orthogonal to the layer. In horizontal lying coal bed layers, the magnetic field will be horizontally polarized with the same field strength across a vertical cross-section. The electric field is vertically polarized. A third electric field is polarized in the horizontal plane and is maximum value at each boundary of the seam.

The horizontal component of the electric field is null near the physical center of the coal seam, albeit if the lower-resistivity boundary layers above and below are about equal in their respective material electrical resistivity.

In underground coal mining practice, horizontal magnetic dipole antennas can be driven by a radio transmitter so a seam wave will propagate within the coal, or other layer of higher-resistivity media. A remote, horizontal magnetic dipole receiving antenna is then used to measure the seam wave with a receiver synchronized to the transmitter.

Conventional RIM type systems typically use fiber-optic cables for the receiver-transmitter synchronization because a metallic cables would interfere with reception by receiving the transmitted signals, and re-radiating them to compete with the direct signal to the receiver. Phase coherent receivers used synchronous detection and accurate phase measurements of the direct signal to ascertain the nature of the coal seam between. The effects on direct signal phase help elicit the nature of the coal layer, given a priori or concomitant material dielectric-constant measurements.

However, the logistics of providing a synchronization channel can be impossible in some mines and in some applications. Therefore, a system and method is needed that does not depend on synchronizing the transmitters and receivers.

SUMMARY OF THE INVENTION

Briefly, a beat-product radio imaging method (RIM) system embodiment of the present invention uses a matched continuous wave (CW) transmitter and receiver to electronically image material in between. Signal attenuation measurements are taken from a number of different transmitter and receiver perspectives around the material. The transmitter and receiver each have a crystal oscillator rated at 10-ppm or better frequency uncertainty. The receiver's crystal oscillator is used as a local oscillator to beat down the transmitter's carrier frequency to baseband. The frequency error between the local oscillator and the transmitter carrier frequencies produces a beat product of less than one Hertz in frequency and its magnitude is inversely proportional to the path attenuation between the transmitter and receiver. An extremely low-pass filter is used to remove everything above one Hertz in the detector. The receiver sensitivity is therefore extraordinarily high.

These and other objects and advantages of the present invention will no doubt become obvious to those of ordinary skill in the art after having read the following detailed description of the preferred SPS receivers which are illustrated in the various drawing figures.

IN THE DRAWINGS

FIG. 1 is a functional block diagram showing a system embodiment of the present invention;

FIG. 2 is a chart of the amplitude (A) versus the frequency spectrum of signals representing the sum and difference heterodynes, and the original inputs that appear in the frequency domain at the output of the mixer in FIG. 1;

FIG. 3 is a functional block diagram of a beat product RIM transmitter embodiment of the present invention.

DETAILED DESCRIPTION OF THE PREFERRED EMBODIMENT

Figure 4:
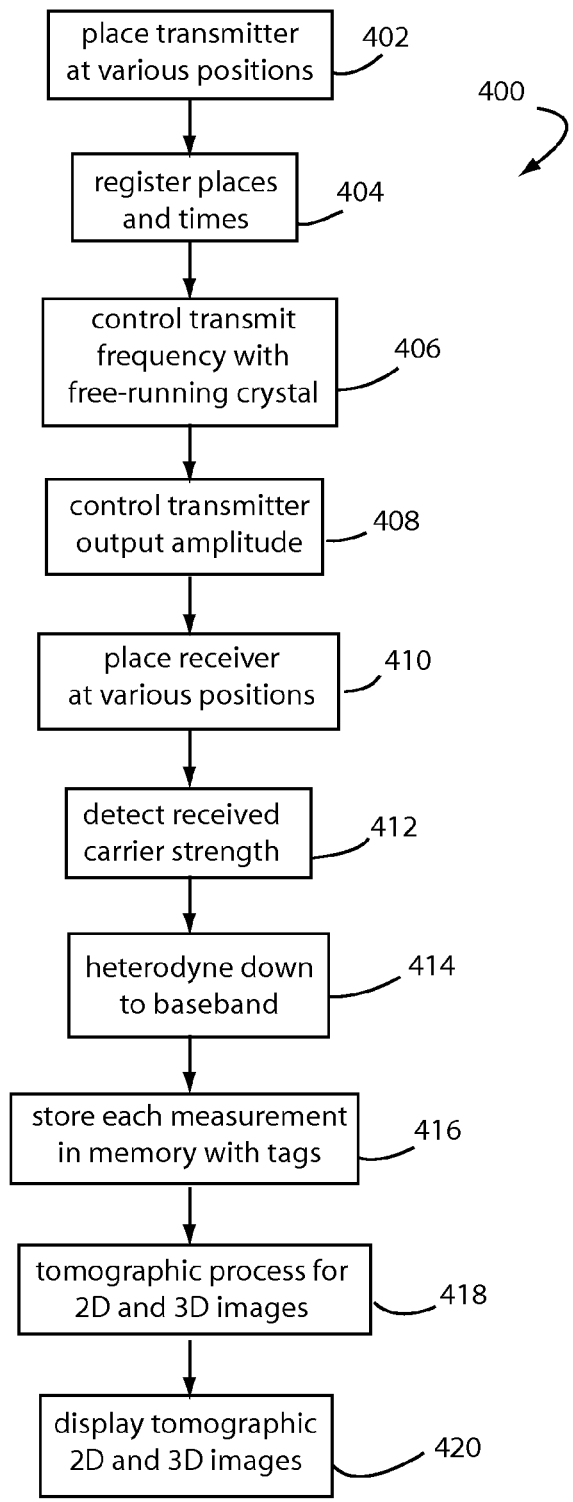
FIG. 4 is a flowchart diagram of a method embodiment of the present invention.

Extraordinarily high receiver sensitivity is needed in RIM coal seam surveys because the radio signals are so highly attenuated by the earth and soils. The limits of receiver sensitivity are reached when the signal-to-noise ratio (SNR) drops too low. Transistor noise in the radio frequency preamplifier is another limiting factor that has been partially overcome with low-noise amplifiers (LNA's). Code division multiple access (CDMA) modulation techniques, such as used in GPS navigation receivers and cell phones, allows correlation processing gains to pull signals out that were otherwise too deeply buried in noise.

Embodiments of the present invention use the beat products of a transmitter's and a receiver's crystal reference oscillators to pull in the signal of interest that would otherwise be buried in too much noise. The signal detection is simple and continuous, and only the amplitude of the CW carrier wave received from the transmitter is the information to be extracted. The receiver is "tuned in" when a mixer after a local oscillator produces rolling-phase outputs under one Hertz in frequency. A synchronous receiver is not necessary.

Epson Toyocom markets their TSX-3225 as a 16-MHz crystal with a frequency tolerance of ±10 ppm and a frequency stability of ±10 ppm over an operating temperature range of −20° C. to +75° C. If the 16-MHz were divided by one hundred and sixty down to 100-KHz, then the frequency stability would be at least than one Hertz. Two such crystals beat together after dividing down to 100-KHz would produce beat products of 200-KHz, 100-KHz, and O-Hz, all ±1-Hz. A low pass filter with a knee just around 1-Hz could easily screen out the higher frequencies and background noise.

FIG. 1 represents a beat-product RIM system 100 for radio imaging a coal-seam or other geologic media 102. A pair of high quality crystals 104A and 104B each have a frequency tolerance of ±10-ppm and a frequency stability of ±10-ppm over an operating temperature range of −20° C. to +75° C. One such crystal, 104A, is disposed in a RIM transmitter 106, the other crystal, 104B, is disposed in a RIM receiver 108.

In a first position on one side of geologic media 102, RIM transmitter 106 sends out a continuous wave (CW) radio frequency (RF) transmission signal 110. Such will be more or less characteristically attenuated by the material that lies along the path between where RIM transmitter 106 is and where the RIM receiver 108 is on the other side of geologic media 102.

In a second position on the same side of geologic media 102, RIM transmitter 106 sends out another CW RF transmission signal 112. Such too will be more or less characteristically attenuated by the adjacent material that lies along the path between where RIM transmitter 106 is now and where RIM receiver 108 still is. A number of attenuation measurements are collected from dozens or hundreds of various locations for the RIM transmitter 106 and RIM receiver 108, enough so a tomographic 2D or 3D image can be constructed of the geologic media 102.

The received CW RF signal 110 can be expected to be very faint, so it needs to be amplified by an RF amplifier 114. A local oscillator (LO) 116 produces an LO-signal 118 from crystal 104B that is at the carrier frequency of the received CW RF signals 110 and 112. These are multiplied in a mixer 120. FIG. 2 represents the resulting heterodynes, the sum, difference, and original inputs which appear in the frequency domain at the output of mixer 122. The difference heterodyne output signal will be below one Hertz, and any noise energy will be well above one Hertz.

Since the reference signals produced from crystals 104A and 104B are not synchronized, a mixer output signal 122 representing the difference in input signals will roll around in phase. But because any reference signals produced from crystals 104A and 104B have a frequency tolerance of ±10-ppm and a frequency stability of ±10-ppm over their operating temperature range, the mixer output signal 122 representing the difference in input signals will not exceed one Hertz when the carrier frequencies are on the order of 100-KHz. The inphase (I) and quadrature phase (Q) components of the mixer output signal 122 are sampled for digital signal processing.

The vector sum of these I and Q components represent the magnitude of the received signals 110 and 112.

The channel and receiver noise will be much higher in frequency than the signal-of-interest, and are screened out entirely by a very low pass filter (VLPF) 126. Linear processing only is used, conventional non-linear processing multiplies the noise along with the signal and the advantages of the present invention will be lost. A linear transform of the coordinates is preferred, a Fourier transform with 256-points can be computed as well. A frequency domain power spectrum is produced that allows the signal and noise energies to be easily separated. The useful signal is monochromatic.

A measurement device 128 measures the magnitude of signal 110 and forwards them to a memory 130 for storage with the time and the transmitter x,y,z positions ($P_1$, $P_2$, ... $P_N$) 132 and the receiver x,y,z positions ($P_1$, $P_2$, ... $P_N$) 134.

The x,y,z positions ($P_1$, $P_2$, ... $P_N$) of the transmitter and receiver can be automatically obtained and entered by optical or wireless readers of marker plaques and stations, GPS navigation receivers, visitation appointment schedules, or manually, both before and after the actual measurement is obtained. The x,y,z positions ($P_1$, $P_2$, ... $P_N$) of the transmitter and receiver can also be taken from an appointment schedule.

A tomographic processor 138 calculates two dimensional (2D) and three dimensional electronic images of media 102 from the many measurements and corresponding transmitter and receiver positions stored in memory 130. A user display 140 can provide real-time guidance for machinery, or important data for planning and safety.

FIG. 3 represents a beat-product RIM transmitter 300 that could be used in the system shown in FIG. 1. The beat-product RIM transmitter 300 includes a high quality crystal 302 connected to an oscillator 304. Frequency synthesizer techniques can be used to produce a higher or lower frequency than that of crystal 302 and a frequency tolerance of ±10-ppm and a frequency stability of ±10-ppm or better over the operating temperature range. The beat-product RIM transmitter 300 is matched to a beat-product RIM receiver that has an unsynchronized local oscillator that also has a frequency tolerance of ±10-ppm and a frequency stability of ±10-ppm or better over the operating temperature range. Embodiments of the present invention depend on this match because synchronization of the receiver to the transmitter is not practical in the intended applications underground.

The times and places visited by the beat-product RIM transmitter 300 are important to know in batch processing that will follow later to render tomographic images. The times and places that the beat-product RIM transmitter 300 was at when it transmitted its signals can be collected as they occur in real-time, or they can be scheduled and delivered according to a schedule 306.

The transmitted CW output magnitude of the beat-product RIM transmitter 300 must either be constant or calibrated so a matching beat-product RIM receiver can collect meaningful measurements of the signal attenuation imposed by the intervening geologic media. An amplitude control 308 provides this function. An antenna 310 is used to radiate the CW signal, and will typically comprise a magnetic dipole for operation at about 100-KHz.

FIG. 4 represents a radio imaging method (RIM) embodiment of the present invention, and is referred to herein by the general reference numeral 400. Such method may be executed as a computer program in a software defined radio platform. RIM 400 begins with a step 402 by placing a continuous wave (CW) radio frequency (RF) radio transmitter with a carrier amplitude (A) at various predetermined places ($P_1$, $P_2$, ... $P_N$) along the fringes of a mass at corresponding known times ($t_1$, $t_2$, ... $t_N$). A step 404 registers the predetermined places ($P_1$, $P_2$, ... $P_N$) and corresponding known times ($t_1$, $t_2$, ... $t_N$) in a computer data memory. A step 406 controls the frequency of the CW RF radio transmitter with a first free-running crystal oscillator that has a frequency uncertainty determined to be better than ten parts per million (10-ppm). A step 408 controls the output amplitude of steady-state radio transmissions from the CW RF radio transmitter. A step 410 places a continuous wave (CW) radio frequency (RF) radio receiver to measure a series of carrier amplitudes ($A_1$, $A_2$, ... $A_N$) at the various predetermined places ($P_1$, $P_2$, ... $P_N$) along the fringes of the mass at the corresponding known times ($t_1$, $t_2$, ... $t_N$).

A step 412 detects the strength of each of the carrier amplitudes ($A_1$, $A_2$, ... $A_N$) by mixing with a local oscillator frequency obtained from a second free-running crystal oscillator having a frequency uncertainty also determined to be better than ten parts per million (10-ppm). A step 414 mixes a received RF CW signal transmission from the radio transmitter, and down-converting to baseband such that a rolling-phase heterodyne results that has a vector magnitude proportional to the attenuating effects of the intervening mass and a frequency of less than one Hertz, wherein the first and second free-running crystal oscillators are not synchronized to any other signals or references, nor each other. A step 416 stores each measurement of the vector magnitude in a computer data memory and tags them with the respective predetermined places ($P_1$, $P_2$, ... $P_N$) corresponding to particular measurements. A step 418 tomographically processes a plurality of measurements stored in the computer data memory to obtain an image of the internal characteristics of the materials in the mass. A step 420 displays these images to a user for real-time control of machinery or operational planning.

Although the present invention has been described in terms of the presently preferred SPS receivers, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A beat-product radio imaging method (RIM) system, comprising:

a matched continuous wave (CW) transmitter and receiver for electronically imaging material in between them, wherein signal attenuation measurements can be collected from a number of different transmitter and receiver perspectives around the material;

a pair of crystal oscillators, one of which is disposed in the transmitter and the other of which is disposed in the receiver, and each crystal oscillator having the same rating for frequency uncertainty better than ten parts per million (10-ppm); and a local oscillator disposed in the receiver that uses a reference frequency obtained from the receiver one of the pair of crystal oscillators, and configured to produce a local oscillator signal that can beat-down the transmitter's carrier frequency to baseband;

wherein, the frequency error between the local oscillator and the transmitter carrier frequencies produces a beat product of less than one Hertz in frequency and its magnitude is inversely proportional to the path attenuation between the transmitter and receiver; and wherein, a low-pass filter is used to remove everything above one Hertz in the detector to produce an output signal for tomographic processing and display of the material characteristics.

2. The RIM system of claim 1, further comprising:
an amplitude control device to fix the amplitude of steady-state radio frequency transmissions output by the CW transmitter.

3. The RIM system of claim 1, further comprising:
a computer data memory for registering a series of predetermined places ($P_1, P_2, \ldots P_N$) visited by each of the CW transmitter and receiver along the fringes of a mass at corresponding known times ($t_1, t_2, \ldots t_N$), and for correlating a series of amplitude measurements ($A_1, A_2, \ldots A_N$) taken by the CW receiver at those places and times.

4. The RIM system of claim 3, further comprising:
a tomographic processor capable of constructing electronic image representations of the internal character of the materials in said mass from information stored in the computer data memory.

5. A radio imaging method (RIM), comprising:
placing a continuous wave (CW) radio frequency (RF) radio transmitter with a carrier amplitude (A) at various predetermined places ($P_1, P_2, \ldots P_N$) along the fringes of a mass at corresponding known times ($t_1, t_2, \ldots t_N$);
registering said predetermined places ($P_1, P_2, \ldots P_N$) and corresponding known times ($t_1, t_2, \ldots t_N$) in a computer data memory;
controlling the frequency of said CW RF radio transmitter with a first free-running crystal oscillator having a frequency uncertainty determined to be better than ten parts per million (10-ppm);
controlling the output amplitude of steady-state radio transmissions from said CW RF radio transmitter;
placing a continuous wave (CW) radio frequency (RF) radio receiver to measure a series of carrier amplitudes ($A_1, A_2, \ldots A_N$) at said various predetermined places ($P_1, P_2, \ldots P_N$) along the fringes of said mass at said corresponding known times ($t_1, t_2, \ldots t_N$);
detecting the strength of each of said carrier amplitudes ($A_1, A_2, \ldots A_N$) by mixing with a local oscillator frequency obtained from a second free-running crystal oscillator having a frequency uncertainty also determined to be better than ten parts per million (10-ppm);
mixing a received RF CW signal transmission from said radio transmitter, and down-converting to baseband such that a rolling phase product results that has a vector magnitude proportional to the attenuating effects of said intervening mass and a frequency of less than one Hertz, wherein said first and second free-running crystal oscillators are not synchronized to any other signals or references, nor each other;
storing a measurement of said vector magnitude in a computer data memory and tagging each with the respective predetermined places ($P_1, P_2, \ldots P_N$) corresponding to particular measurements;
tomographically processing a plurality of measurements stored in said computer data memory to obtain an image of the internal characteristics of the materials in said mass; and
displaying said image to a user.

6. The RIM of claim 5, wherein:
a single radio transmitter and receiver are used for all measurements and the radio transmitter has a constant output amplitude for all transmissions resulting in each measurement.

7. The RIM of claim 5, further comprising:
translating an appointment time from said corresponding known times ($t_1, t_2, \ldots t_N$), and assuming said transmitter transmitted its transmission from a corresponding one of said various predetermined places ($P_1, P_2, \ldots P_N$).

8. The RIM of claim 5, wherein said carrier frequency is about 100-KHz.

9. The RIM of claim 5, further comprising:
automatically inputting the position of either of the radio transmitter or receiver in real-time while a measurement is being obtained.

10. A method for measuring amplitude information of extremely faint continuous wave (CW) radio frequency (RF) transmissions without synchronous detection methods, comprising:
heterodyning a CW signal received from a remote radio transmitter down to baseband such that the difference heterodyne will have a frequency less than one Hertz; and
filtering out all other heterodynes and noise having frequencies exceeding one Hertz;
wherein non-linear detection methods are not used to produce a measurement of the strength of said CW signal received from said remote radio transmitter.

11. The method of claim 10, further comprising:
controlling the operational frequency of the carrier produced by said remote radio transmitter only by the characteristic frequency stability of a first crystal oscillator;
wherein, the operational frequency of the carrier produced by said remote radio transmitter is not synchronized to any other reference.

12. The method of claim 10, further comprising:
controlling the operational frequency of a local oscillator used in the heterodyning only by the characteristic frequency stability of a second crystal oscillator;
wherein, the operational frequency of the local oscillator is not synchronized to any other reference.

13. The method of claim 10, further comprising:
controlling the operational frequency of the carrier produced by said remote radio transmitter only by the characteristic frequency stability of a first crystal oscillator;
controlling the operational frequency of a local oscillator used in the heterodyning only by the characteristic frequency stability of a second crystal oscillator;
wherein, the operational frequency of the carrier produced by said remote radio transmitter is not synchronized to any other reference; and
wherein, the operational frequency of the local oscillator is not synchronized to any other reference.

14. The method of claim 13, wherein the characteristic frequency stabilities of said first and second crystal oscillators are better than ten parts per million (10-ppm).

* * * * *